United States Patent [19]

Martin et al.

[11] Patent Number: 5,486,079
[45] Date of Patent: Jan. 23, 1996

[54] BREAKABLE BOLT ASSEMBLY

[75] Inventors: Dennis C. Martin, Gold Hill; Mark A. Reeb, Grants Pass, both of Oreg.

[73] Assignee: Advanced Parts Technology, Inc., Grants Pass, Oreg.

[21] Appl. No.: 270,439

[22] Filed: Jul. 5, 1994

[51] Int. Cl.$^6$ .................... F16B 19/00; F16B 35/00
[52] U.S. Cl. .................... 411/392; 411/5; 411/354; 411/361; 280/851
[58] Field of Search .................... 411/3–5, 237, 411/354, 360, 361, 392, 908, 916; 280/851

[56]  References Cited

U.S. PATENT DOCUMENTS

| | | | |
|---|---|---|---|
| 89,066 | 4/1869 | Nichols | 411/237 |
| 1,609,700 | 5/1928 | Egbert | 411/916 |
| 2,083,054 | 6/1937 | Cline | 411/5 |
| 2,449,846 | 9/1948 | Gilman | 411/237 |
| 2,826,428 | 3/1958 | Lincoln | 280/154.5 |
| 3,095,215 | 6/1963 | Black | 280/154.5 |
| 3,158,386 | 11/1964 | Tillinghast et al. | 280/154.5 |
| 3,219,363 | 11/1965 | Dalsey et al. | 280/154.5 |
| 3,258,887 | 7/1966 | Mostoller | 52/98 |
| 3,333,868 | 8/1967 | Sogoian | 280/154.5 |
| 3,700,260 | 10/1972 | Moore et al. | 280/154.5 |
| 3,778,086 | 12/1973 | Moore et al. | 280/154.5 |
| 3,822,897 | 7/1974 | Heath | 280/154.5 |
| 3,966,341 | 6/1976 | Bailey et al. | 411/392 X |
| 4,326,727 | 4/1982 | Rock | 280/154.5 |
| 4,776,737 | 10/1988 | Wollar | 411/908 X |
| 4,856,816 | 8/1989 | Francis | 280/154.5 |
| 5,044,667 | 9/1991 | Manning | 280/851 |

*Primary Examiner*—Neill R. Wilson
*Attorney, Agent, or Firm*—Jacobson, Price, Holman & Stern

[57] ABSTRACT

A breakable bolt assembly comprising a pin member, a collet member and a thumb knob member. The assembly is designed to mount without the use of hand or power tools, and features a pin member which breaks apart when the shear force on it exceeds a predetermined magnitude. The pin member comprises an elongated pin body and a pin head. A proximal length portion of the pin body has a plurality of flutes transverse to the length of the pin body and spaced from each other by ribs. The diameter of the pin body at the flute most proximate the pin head is smaller than at the more distal flutes. Thus, shear force is transferred to the most proximal flute, and when the force exceeds a predetermined magnitude, the pin member breaks apart at the juncture of the pin body and pin head. The collet member has an internal passage for receiving the distal end of the pin member, and is compressible around the pin member. The thumb knob member has an internal passage for receiving the distal end of the collet member and compresses the collet member around the pin member. Furthermore, the thumb knob member has a length portion with internal threads which mate with external threads of the pin body of the pin member. The entire bolt assembly is made of a molded resin material which is resistant to corrosion.

19 Claims, 4 Drawing Sheets

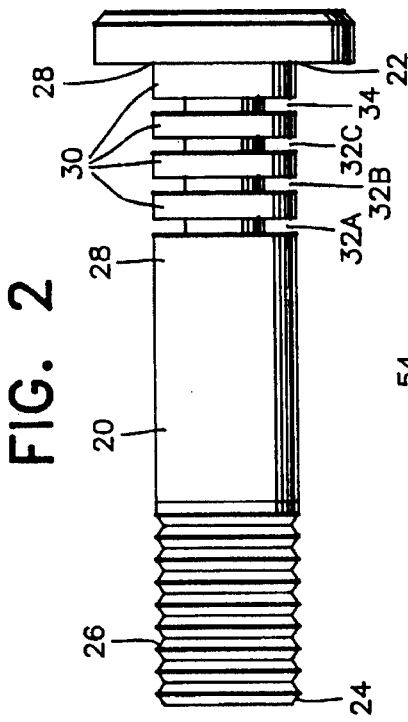
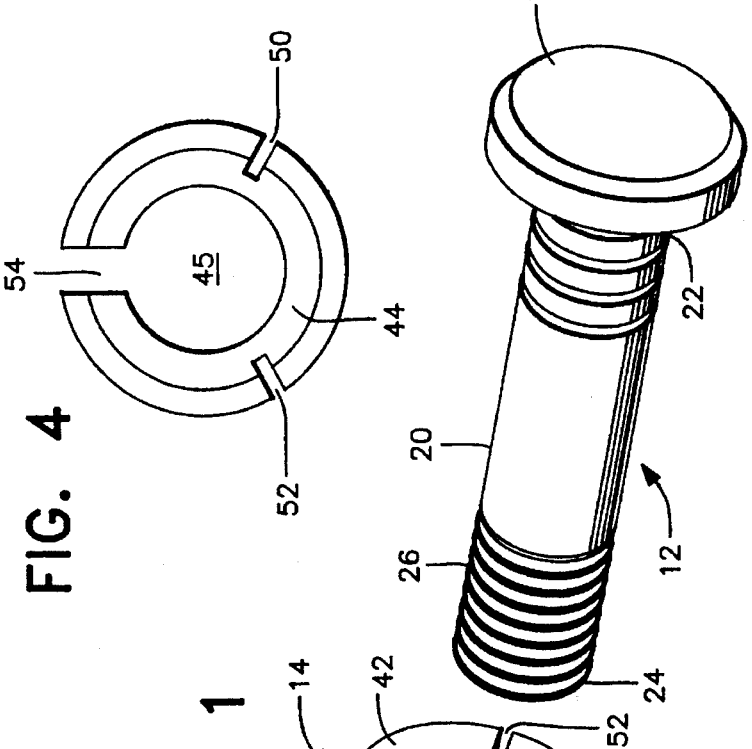
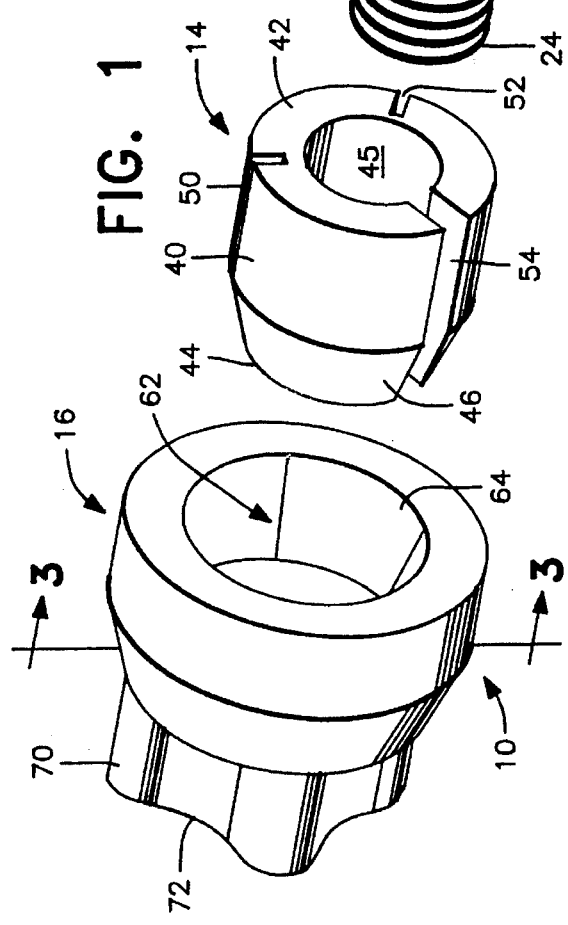
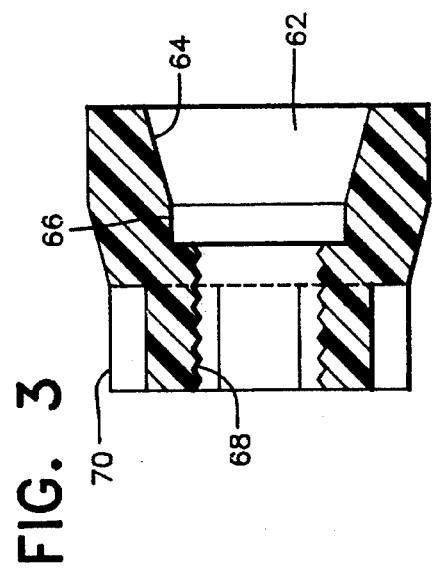

BREAKABLE BOLT ASSEMBLY

BACKGROUND OF THE INVENTION

1. Field of the Invention

The present invention relates to a breakable bolt assembly, and particularly, but not limited to, a breakable bolt assembly especially useful for securing a mud flap to a hanger.

Currently, the standard truck mud flap bolt is 3/8 inches in diameter and 1–2 inches long. It is a steel bolt. The top edge of the mud flap has mounting holes to receive the bolt. The mud flap is secured to a hanger which is attached to the truck by mounting the bolts through the mud flap and through the holes in the hanger. Standard hex head bolts and hand or power tools are needed to mount the mud flap to the hanger.

It is important that the bolt be strong enough to hold the mud flap, which is usually at least 1/2 inch thick. The hanger is typically made from steel or formed from welded iron bar stock. The average mud flap weights approximately 10–30 pounds, and in use, as much as 100 pounds of snow and ice can accumulate on the flap. This places substantial stress on the bolts.

In addition, the bolt assembly must also withstand the forces associated with twisting, turning, vibration, as well as the forces associated with downward stress. Moreover, there is significant stress placed on the mud flap when the truck travels at speeds of 55–60 miles per hour. The mounting orientation of the mud flap becomes altered from these forces, and is prone to more serious damage.

Specifically, a critical stress on the mud flap occurs when a truck backs up over a contorted mud flap. When this occurs, the mud flap is usually torn off the hanger, the mounting holes of the flap can be destroyed and, therefore, the mud flap is no longer usable by the driver until it is repaired or replaced, which can be time consuming and expensive. Oftentimes, the hanger also is destroyed.

Furthermore, an aluminum bolt cannot be used with a steel hanger because a galvanic reaction will occur between the two metals. Even if steel bolts are used with a steel hanger, the steel bolts rust from moisture and harsh environments, thus deteriorating the bolt. The bolts become damaged at the threads by impact with rocks, or often road tar adheres to the bolt. This making it difficult or nearly impossible to remove the bolt.

2. Prior Art

U.S. Pat. Nos. 3,258,887 to Mostoller; 2,826,428 to Lincoln; 3,778,086 to Moore et al.; 3,822,897 to Heath; 3,158,386 to Tillinghast; and 3,695,215 to Black are relevant to the present invention.

The Mostoller patent discloses a bolt designed to separate from the fasteners and materials it is attached to in the event of an explosion. Specifically, the Mostoller bolt comprises a standard bolt with a single reduced shank on a portion of the shaft and is designed to fail upon a sudden force tearing away the bolt.

The Lincoln patent discloses a replaceable splash guard featuring a wing nut which can be installed by hand, but usually requires a tool to remove. This device makes no provision for the avoidance of damage to the hanger if the mud flap is subjected to large magnitudes of shear force.

The Moore patent discloses a mud flap mounting means featuring a spring loaded clamp which is designed to open when a downward stress occurs, releasing the mud flap unharmed. A problem with this device is that it is readily exposed to the elements and is susceptible to damage from road tar, stones, dust and grit. The solution provided by the Moore patent, like so many others in the industry, requires special mud flap hangers, clamps, hinges, springs, etc. Consequently, this is a very costly solution by comparison to the standard bolt assemblies.

The Heath patent discloses a perforated mud flap that will separate after a certain stress is reached when the truck backs over the mud flap. The perforations reduce the strength of the mud flap to about 1/5 of the standard mud flap, which is 100 ft/lbs of shear. Unfortunately, the concept is not practical because 100 ft/lbs of shear is reached almost immediately when a tire backs over a mud flap.

The Tillinghast patent discloses a specially designed slotted mud flap bushing and clamp device that will allow for the flap to release from the hanger before harm occurs to the flap. If this occurs satisfactorily, the user must remove the bolt mountings to re-install the mud flap. The designs of the mountings and materials used are subject to corrosion and road damage, which would make re-mounting a problem. Consequently, the device has not been accepted well in the industry.

The Black patent discloses a perforated weakened mud flap which is designed to tear off in sections if backed over. This makes possible the use of the same flap more than once if it is backed over, but the remaining flap is smaller than before.

The shortcomings in the prior art endeavors are clear. There is a need to provide an inexpensive bolt assembly to mount and repair the mounting of standard mud flaps without requiring special hangers, tools, clamps and the like.

SUMMARY OF THE INVENTION

The present invention is directed to a bolt assembly made of a hard plastic material which will not rust or corrode, and which enables the bolt assembly to have a high modulus of elasticity. The bolt assembly comprises a pin member, collet member and thumb knob member. The pin member is designed to break apart when subjected to shear force greater than a predetermined magnitude. Specifically, the pin member features a pin body and round pin head, the pin body having a proximal length portion adjacent the pin head which has multiple flutes transverse to the pin body. The diameter of the pin body of the flute most proximate the pin head is smaller than that of the more distal flutes. Consequently, the pin member will break apart at the most proximal flute when subjected to shear force greater than a predetermined magnitude.

The objects and advantages of the present invention will become more apparent when reference is made to the following description, taken in conjunction with the accompanying drawings.

BRIEF DESCRIPTION OF THE DRAWINGS

FIG. 1 is an exploded perspective view of the bolt assembly according to the present invention.

FIG. 2 is an enlarged side view of the pin member of the bolt assembly.

FIG. 3 is a cross sectional view taken through line 3—3 of the thumb knob member shown in the assembly of FIG. 1.

FIG. 4 is an end view of the collet member.

DETAILED DESCRIPTION OF THE PREFERRED EMBODIMENT

Figure 5A:
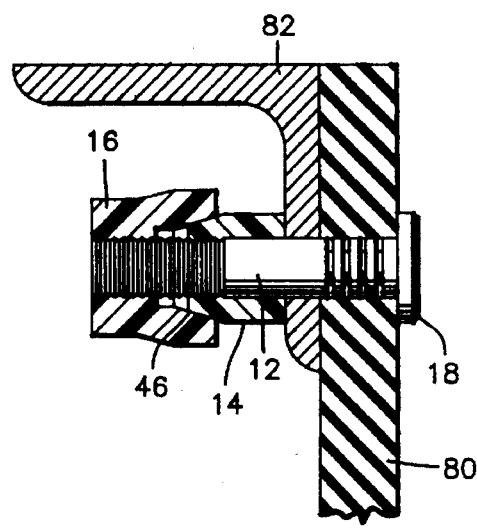
FIGS. 5A, 5B, 5C and 5D are partial cross sectional views of the bolt mounted through a mud flap and hanger, and illustrating the various stages of the bolt assembly under stress.

Referring to FIGS. 1–4, the bolt assembly is shown generally at 10, and comprises a pin or pin member 12, a collet member 14 and a thumb knob or abutment member 16. Generally, the collet member 14 is inserted over the end of the pin member 12, on the opposite side of a mud flap hanger, and the thumb knob or abutment member 16 fits over the collet member 14 and pin member 12.

The pin member 12 is sized to the standard bolt diameter of ⅜ inch, though it can be optionally sized to any diameter. The pin member comprises a head 18 and body 20 having a proximal end 22 and a distal end 24. The head 18 is preferably round because no tools are needed to mount and tighten the bolt assembly. There are threads provided along a length portion 26 at the distal end of the body 20. The threads preferably have a 30 degree lead-in with no thread relief.

An alternating series of flutes (channels) and ribs are provided along a length portion 28 towards the proximal end of the body 20. Specifically, four ribs 30 are provided which are spaced by channels 32A, 32B, 32C and channel 34. The ribs 30 which preferably are sized to the standard bolt diameter of ⅜ inch provide protection to the channels 32A, B, C. Channel 34 is most proximate the head 18. The diameter of the body in channel 34 is preferably smaller than the diameter of the body in channels 32A, 32B and 32C, and the diameter of the body in channels 32B and 32C may be smaller than the diameter in channel 32A. Specifically, the channel 34 nearest the head 18 is preferably designed to be the weakest point of the pin member 12. This is also the point in the bolt assembly where the greatest stress and shear forces are ultimately transferred. Moreover, the ribs and channels of the pin member 12 are sized and positioned so that the pin member 12 will shear or break apart at the channel 34 when subjected to a downward or shear force which exceeds a predetermined threshold. This will be explained in greater detail hereinafter.

The number and size of the ribs and channels may vary according to the particular application of the bolt assembly. For example, to support a typical ½ inch thick rubber truck mud flap, four flutes and four ribs are provided in the preferred ⅜ inch diameter bolt. In a preferred design, the channels should be sized to the following dimensions. In the fourth channel farthest from the head, the diameter of the pin body should preferably be about 0.162 inches, the diameter of the pin body in the third and second channels should preferably be about 0.155 inches and the diameter of the channel closest to the head should preferably be about 0.148 inches. In another channel design, the diameter of the pin body in all three channels farthest from the head should be about 0.240 inches and the diameter for the channel closest to the head should be about 0.220 inches. Still another example of a suitable pin design is one having channels farthest from the head being about 0.195 inches in diameter, and the channel closest to the head being about 0.177 inches in diameter. In general, the channel nearest the pin head should have a diameter which is approximately 5–10% smaller than the diameter of the channel farthest from the head.

Focusing now on the collet member 14 shown in FIGS. 1 and 4, the collet member comprises a generally cylindrical body 40 having a proximal end face 42 and a distal end face 44. An internal passage 45 extends through the body 40 and is sized to receive the pin member 12. Further, a portion of the collet body adjacent the distal end 44 includes a length portion 46 which is tapered preferably at approximately 15 degrees inward towards to the distal end 44.

In addition, the collet member includes three slots 50, 52 and 54 which extend the entire length of the body 40. Slot 54 is the widest and also passes entirely through the collet wall to the internal passage 45, and is designed to make the collet member 14 compressible. Slots 50 and 52 are relief slots which are not as wide as slot 54 and do not pass entirely through the body 40. These latter slots add compressibility and also contribute to a locking feature, which will be explained hereinafter. By way of an example in which the collet member has an outside diameter of about 0.390 inches, the slot 54 is about 0.100 inches wide, whereas slots 50 and 52 are only approximately 0.040 inches wide and approximately 0.090 inches deep. The slots 50, 52 and 54 are offset from each other by an angle of approximately 120 degrees.

As will become more apparent hereinafter, the collet member 14 provides a lateral force against the thumb knob or abutment member 16 and hanger to resist loosening of the bolt assembly caused by vibration, twisting, turning and pulling. The collet member 14 also provides additional support to the pin member body 20. In use, the collet member locks into the thumb knob or abutment member 16 and shields the pin member body from external corrosion effects.

Turning now to FIGS. 1 and 3, the thumb knob member 16 will be further described. The thumb knob or abutment member 16 comprises a body 60 circumscribing an internal passage 62. The internal passage 62 opens in a tapered mouth 64 which tapers inwards at preferably about 15 degrees for a length portion of the internal passage which is designed to mate with tapered portion 46 of collet member 14. The next length portion 66 of the internal passage is straight, and the final length portion 68 is threaded, to the end of the thumb knob or abutment member 16. The threaded length portion 68 is designed to mate with the external threads 26 on the pin member 12. Gripping ribs 70 and indents 72 are provided on the end of the thumb knob or abutment member 16 to facilitate rotation and tightening of the thumb knob or abutment member 16 around the pin member 12.

The entire bolt assembly is preferably made of a specialized molded resin material called Nylatron GS-21, which is manufactured by The Polymer Corporation, and sold under the trade name POLYPENCO. This material is the molded resin version of Nylatron GSM, which is a cast nylon. Nylatron GS-21 molded resin consists of a base material of 6/6 nylon, molybdenum disulphide and carbon black. Moreover, the molybdenum disulphide is present as finely divided particles which are uniformly distributed

NYLATRON PHYSICAL PROPERTIES SCHEDULE (GSM/GS-21)

| ITEM | DESCRIPTION | ASTM | UNIT | NYLATRON GS-21 |
|---|---|---|---|---|
| 1 | TENSILE STRENGTH | D638 | PSI | 13,250 |
| 2 | ELONGATION | D638 | % | 12 |
| 3 | TENSILE MODULUS | D638 | PSI | 600,000 |
| 4 | SHEAR STRENGTH | D732 | PSI | 10,000 |
| 5 | FLEXURAL STRENGTH (YIELD) | D790 | PSI | 16,500 |
| 6 | FLEXURAL MODULUS | D790 | PSI | 475,000 |
| 7 | HARDNESS ROCKWELL | D785 | R/M | 119/85 |
| *8 | DEFORMATION UNDER LOAD 2000 PSI-122 DEGREES F. | D621 | % | 1.35 |
| 9 | COMPRESSIVE STRENGTH | D695 | PSI | 12,750 |
| *10 | DEFLECTION TEMP. OF ZERO FER.. (264 PSI) | D648 | oF | 210 |
| 11 | MELTING POINT | D789 | oF | 489 |
| 12 | COEFFICIENT OF A* LINEAR THERMAL EXPANSION B* | D 698 D 698 | oF oF | 2.7 3.6 |
| 13 | TENSILE IMPACT | D1822 | | 90 FT.LBS. PER SQ.IN. |
| 14 | SPECIFIC GRAVITY | D792 | | 1.16 |
| 15 | WATER ABSORPTION 24 HRS. SATURATION | D570 D 570 | % % | 1.10 8.0 |
| 16 | FLAMMABILITY ¼ × ½ SPECIMEN | D635 | IN./ MIN. | SELF- EXTIN- GUISHING |
| *17 | SHRINKAGE- LINEAR ¹⁄₁₆ TO ¼ | -LINEAR IN./IN. | | .007/.017 |

NOTE: (A) = 20 F. TO −73 F.
(B) = 10 F. TO −160 F.

throughout the resin. This reduces the coefficient of expansion, water absorption and shrinkage, to provide overall better dimensional stability than other unmodified resins. Carbon black is added for ultraviolet light protection. The actual quantities of the components are maintained a trade secret by the manufacturer.

Set forth above is a listing of the properties of the Nylatron material preferably used in accordance with the present invention. Other materials which have similar properties may also be used.

The above-described material of the bolt assembly provides for a slow wear rate, low coefficient of friction, no risk of corrosion, low exposure to damage by road hazards and no galvanic or rusting actions. Alternate materials which meet, or approach, the prescribed specifications can be used in the present invention, although they may not provide all of the advantages of the preferred Nylatron GS-21 material.

Referring now to FIGS. 5A–5D, 6 and 7, the operation of the bolt assembly 10 to mount a mud flap 80 to a hanger 82 disposed rearward and above a rear wheel assembly 83 of a vehicle 85 will be described. The mud flap 80 and hanger 82 are shown in perspective view in FIG. 7. The hanger 82 comprises mounting tabs 84 having holes 86 to receive a mounting bolt. The mud flap 80 has multiple holes 88 therein also to receive a mounting bolt. Typically, there are four holes per mud flap, but this may vary.

The pin member 12 is passed through the mud flap 80 and hanger 82. The collet member 14 is placed over the end of the pin member and pushed up tightly against the backside of the hanger 82. The thumb knob or abutment member 16 is then placed over the exposed end of the pin member 12 and over the tapered end of the collet member 14. The internal threads of the thumb knob or abutment member 16 eventually engage the external threads of the pin member 12, and the thumb knob or abutment member 16 can be tightened by hand around the collet member 14 and pin member 12. When the thumb knob or abutment member 16 is rotated around the pin member 12, the taper 64 within the thumb knob or abutment member 16 pushes on the taper 46 of the collet member 14. Due to the slots 50, 52 and 54, the collet member 14 compresses onto the pin member 12 and locks the assembly tightly in place. The tension force of the collet member to expand locks the collet member in place and dampens any vibration in the assembly. This assembly, once locked, is immune to swelling and constriction, and the opposing forces of the compressed collet member against the pin head keep the assembly tight and stable. Further, the bolt assembly can be easily installed and removed by hand, without the need for any hand or power tools. In sum, there are two forces which make the bolt assembly stable and strong. The first is the lateral force between the collet member 14 and pin head 18. The second is the expanding force of the collet member 14 against the thumb knob or abutment member 16 and the compression force of the collet member 14 and the shank body 20.

Figure 5B:
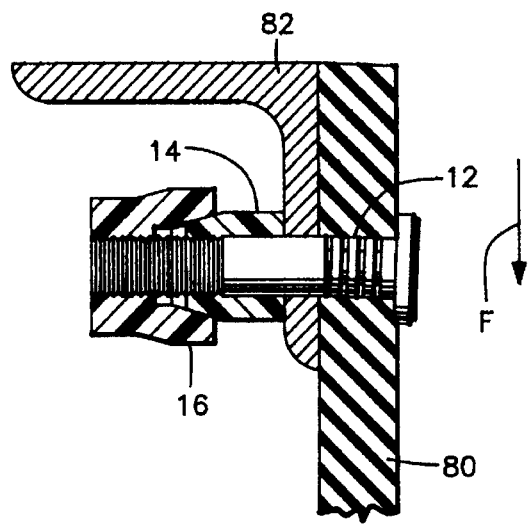
Figure 5C:
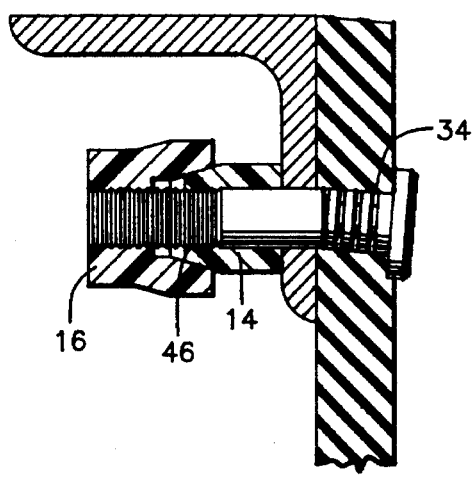
Figure 8:
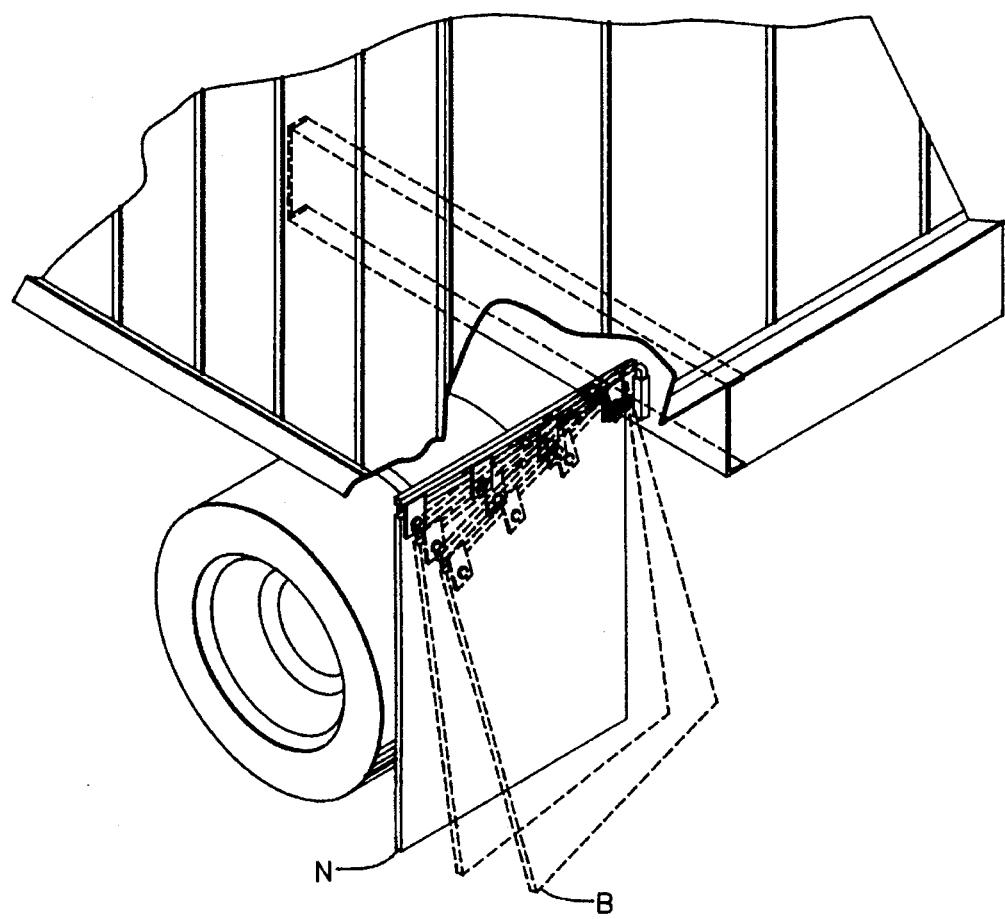
FIG. 8 is a perspective view of a mounted mud flap that is subjected to forces which are insufficient to break the pin member.
Figure 9:
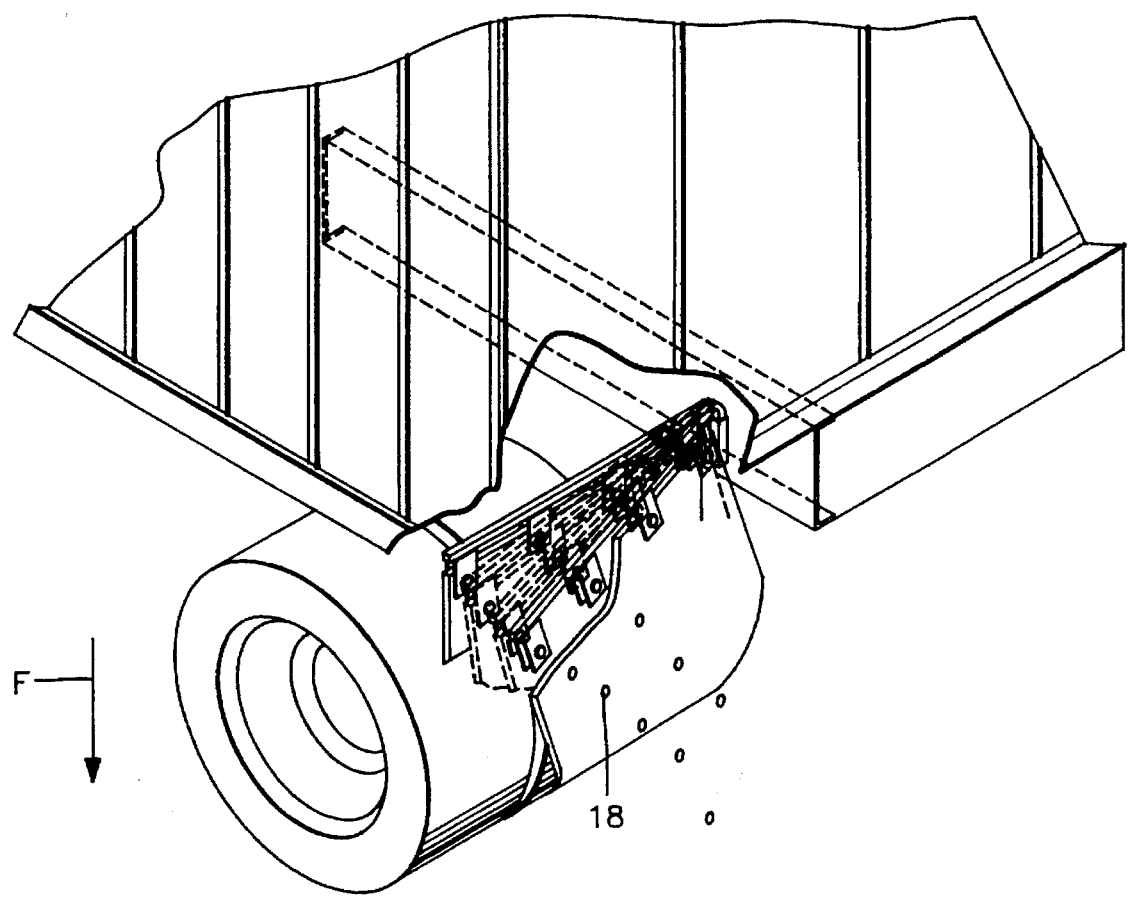
FIG. 9 is a perspective view of a mounted mud flap that is subjected to forces which are sufficient to break the pin member.

Once the bolt assembly is secured, the bolt is designed to withstand a predetermined threshold of shear force, and once that threshold is exceeded, the pin member 12 will break. Specifically, referring to FIGS. 5B, 5C, 5D and 6, the arrow F represents a resultant downward or shear force on the pin member. This force results from twisting, or turning motion of the mud flap, and also in particular, the occurrence of the mud flap getting caught in an adjacent rotating tire (FIGS. 8 and 9). The fluted structure of the pin member and the nature of the material of the assembly allows for the pin member to bend and absorb the shear force F. This is shown in FIGS. 5B and 5C. However, when the shear force F exceeds a predetermined threshold, such as 500 Newtons (N), the bolt is designed to break at the channel 34.

Figure 5D:
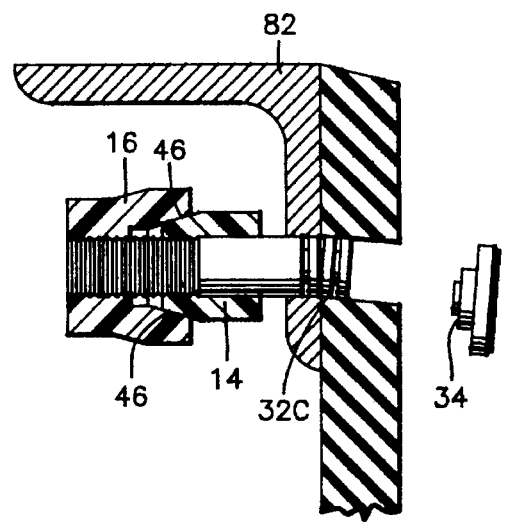
Figure 6:
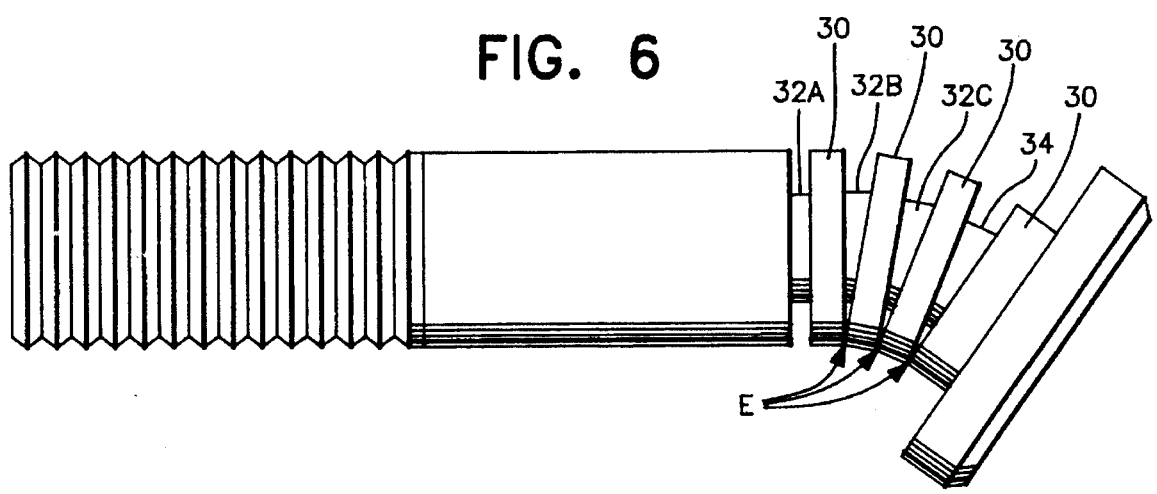
FIG. 6 is an enlarged side view of the pin member undergoing a downward force, just prior to breakaway.
Figure 7:
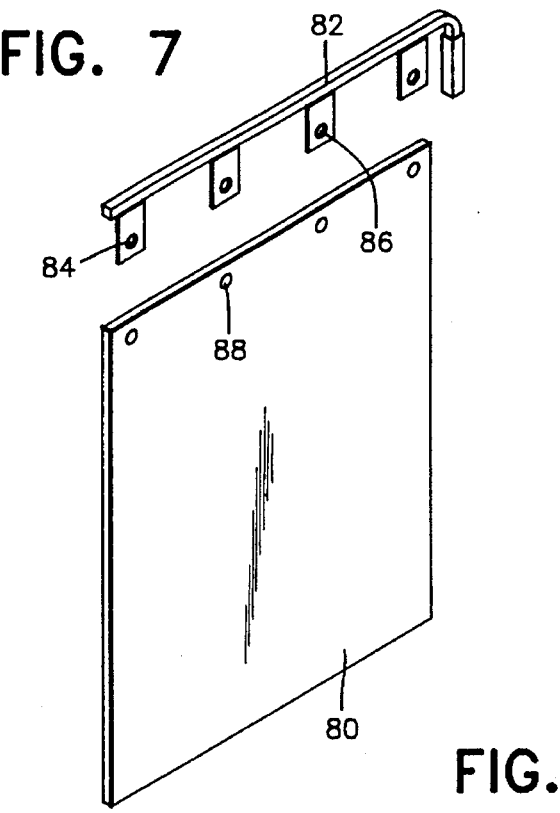
FIG. 7 is a view of the mud flap and hanger through which the bolt assembly is mounted.

Specifically, the bolt is designed so that the fluted structure transfers force first to the most distal channel shown at 32A in FIG. 6. This portion of the pin member 12 will start to bend at a predetermined force, such as 415 Newtons. As the bending force on the bolt increases, the next channel 32B will start to bend when the transferred force exceeds a threshold, such as 375 Newtons, upon which the force will be transferred to the next channel 32C. Forces are transferred to the most proximal channel 34, until the proximal channel 34 is subjected to more than a threshold shear force. As the shear force approaches that threshold, the more distal flutes will collapse against each other, such that their bottom edges engage each other as shown at points E in FIG. 6. This restricts further bending of the bolt and thus transfers the greatest shear force to the top of the pin member and the pin head at the junction of the bolt body and pin head. When the shear force is greater than say 500 Newtons, the bolt will break apart at the flute 34, as shown in FIG. 5D.

The particular level of shear force that will break the bolt is dependent on a number of design factors, including the number of flutes, the dimensions of the flutes, the diameter of the bolt, etc. A ⅜ inch diameter bolt having the abovespecified flute diameters for mounting mud flaps is preferably designed to break apart at the most proximal flute at approximately 500 Newtons. It should be understood that the pin member can be designed to transfer forces differently, and thus have a different break-apart threshold. For example, the flutes may have graded diameters such that the diameter of the pin body of the most distal flutes is greater (in a graduated way) than the diameter of the proximal flutes.

FIG. 8 illustrates the movement of the mud flap in the event that the shear force on the pin member 12 does not exceed its break-apart threshold. In this case, the mud flap and hanger may flex to a point B, but insufficient force on the pin member will prevent it from breaking apart. Consequently, the mud flap will not come loose from the hanger, and the entire assembly will eventually return to its normal position shown at N.

However, as shown in FIG. 9, if the mud flap is pulled, for example, beneath a rotating tire, then it is quite likely that the pin member will be subjected to shear force greater than the break-apart threshold, upon which the pin member will break apart, and the pin heads from one or more bolts will come loose from their respective bolt bodies. However, the holes in the mud flap will not break because the bolt assembly will break apart before sufficient force is applied to the mud flap. This is beneficial because it is much less expensive to replace a bolt assembly than to repair or replace a mud flap or mud flap hanger.

The bolt assembly according to the present invention has been described with particular utility for mounting a mud flap onto a hanger. However, it should be understood that the bolt assembly may have many other uses, particularly where it is desirable to have a bolt break apart when a shear force at the juncture of the pin and pin head is more than a predetermined magnitude. Modifications to the flutes, dimensions of the pin and tensile grade of the material, can be made to suit particular applications. The bolt assembly of the present invention is particularly useful for mounting mud flaps because of the need to prevent damage to mud flaps and hangers if subjected to large forces at the mounting bolt.

It is further to be understood that the foregoing description and drawings should be considered illustrative only of the principles of the invention. Since numerous modifications will readily occur to those skilled in the art, it is not desired to limit the invention to the exact construction and operation shown and described and, accordingly, all suitable modifications and equivalents may be resorted to falling within the scope of the invention.

We claim:

1. A break-apart bolt assembly comprising:
   a pin member comprising an elongated pin body and a pin head, said pin body having a proximal end and a distal end, said proximal end of said pin body having a plurality of flutes transverse to the length of said pin body and spaced from each other, said pin body having external threads along a length portion at said distal end thereof;
   a collet member body having proximal and distal ends, said collet member body having an internal passage for receiving said distal end of said pin body and being compressible around the pin body and said distal end having a length portion which is tapered inward for a predetermined length of said collet member body;
   threaded abutment member having an internal passage for receiving said distal end of the collet member body, said internal passage having a mouth which opens to a first length portion which is tapered inward from said mouth, and a second length portion having internal threads which mate with said external threads of said pin body of said pin member, said first length portion engaging said tapered length portion of said collet member body to lock onto said collet member body and pin body.

2. The bolt assembly of claim 1, wherein said pin member, collet member body and nut means are each made of a molded resin material.

3. The bolt assembly of claim 2, wherein said molded resin material is Nylatron GS.

4. The bolt assembly of claim 1, wherein said collet member comprises at least one longitudinal slot which extends from said proximal end to said distal end.

5. The bolt assembly of claim 4, wherein said collet member body includes first, second and third longitudinal slots positioned at predetermined angular positions on the collet member body, said first longitudinal slot extending the length of said collet member body and through to said internal passage, and said second and third slots extending the length of said collet member body and each having a depth less than that of said first slot.

6. The bolt assembly of claim 1, wherein the diameter of said pin body at the flute most proximate said pin head is smaller than at the more distal flutes so as to define a break-apart point at which said pin body will break when subjected to shear force greater than a predetermined break-apart threshold whereby said pin body bends at a length portion occupied by said plurality of flutes in response to shear force and breaks apart at the most proximal flute when the shear force on the pin body at the most proximal flute exceeds said predetermined break-apart threshold.

7. A break-apart bolt assembly comprising:
   a pin member comprising an elongated pin body and a pin head, the pin body having a proximal end and a distal end, a proximal length portion of the pin body being bendable in response to shear force, and in response to shear force greater than a predetermined magnitude, the pin body breaks apart at the juncture of the pin body and pin head, the pin body having external threads along a length portion at the distal end thereof;
   a collet member having a generally cylindrical body with proximal and distal ends, and an internal passage for receiving the distal end of the pin member, the collet member being compressible around the pin member;
   an abutment member having an internal passage for receiving the distal end of the collet member and the distal end of the pin member and for compressing the collet member around the pin member, the internal passage having a first length portion with internal threads which mate with the external threads of the pin body of the pin member, the proximal length portion of the pin body comprising a plurality of flutes transverse to the pin body and spaced from each other.

8. The bolt assembly of claim 7, wherein said abutment member comprises a second length portion engaging the tapered length portion of the collet member to secure onto the collet member and pin member.

9. The bolt assembly of claim 8, wherein the second length portion of said abutment member is tapered inward.

10. The bolt assembly of claim 7, wherein the diameter of the pin body of a flute most proximate the pin head is smaller than the diameter of the pin body of the other flutes.

11. In combination, a breakable bolt assembly for mounting a heavy object from a base support, the breakable bolt assembly comprising:
    a breakaway pin member having an elongated pin body with a proximal end and a distal end and a pin head at the proximal end, a proximal length portion of the pin body adjacent the pin head being breakable when subjected to shear force greater than a predetermined magnitude, said breakaway pin member inserted through the base support and the heavy object such that the distal end and pin head are on opposite sides of the base support and the heavy object;

a compressible collet member having an internal passage for receiving the distal end of the pin member and being compressed around the pin member;

an abutment member having an internal passage for receiving the distal end of the collet member and engaging an outer surface of the collet member to compress the collet member around the pin member and counteract expansion forces of the collet member, said abutment member further comprising means for attaching onto the pin member and for applying a longitudinal force between the pin head and the collet member to secure the heavy object to the base support, the proximal length portion of the pin member comprising a plurality of flutes which are transverse to the pin body and spaced from each other.

12. The combination of claim 11, wherein the pin member includes a threaded length portion adjacent the distal end, and wherein the means for attaching the thumb knob member comprises a threaded length portion to mate with the threaded length portion of the pin member.

13. The combination of claim 11, wherein the diameter of the pin body at the flute most proximate the pin head is smaller than at the flutes more distant from the pin head.

14. The combination of claim 11, wherein the internal passage of said abutment member comprises a mouth which receives the pin member, and first and second length portions, the first length portion being threaded and the second length portion being adjacent the mouth and being tapered inward from the mouth.

15. The combination of claim 14, wherein the collet member has a length portion adjacent the distal end which is tapered inward for a predetermined length thereof, and which is engaged by the tapered first and second length portions of said abutment member for compressing by said abutment member.

16. The combination of claim 11, wherein the heavy object is a mud flap and the base support comprises a mud flap hanger which is rigidly attached to a truck vehicle.

17. In combination with a vehicle supported mounting member disposed rearward and above a ground wheel assembly of the associated vehicle, said mounting member defining an upstanding wheel flap mounting portion extending transversely of said vehicle and having a generally horizontal front-to-rear extending bore formed therethrough, a generally vertical wheel flap portion having an upper margin disposed behind said mounting portion and provided with a front-to-rear extending aperture formed therethrough registered with said bore and a lower margin spaced behind said wheel assembly, a bolt assembly for securing said upper margin to said mounting portion, said bolt assembly including an elongated pin body passing through said bore and aperture and having a proximal end and a distal end, a pin head on said proximal end rearward of said upper margin, said proximal end of said pin body having a plurality of flutes transverse to the length of said pin body and spaced from each other to define break-apart points at which the pin member will break when subjected to shear force greater than predetermined break-apart threshold force, said pin body having external threads along a length portion at said distal end, abutment structure threaded on said length portion and disposed forward of said mounting portion and threaded along said length portion toward said pin head to clamp said upper margin to said mounting portion with said flutes under greater tensional stress than the portions of said pin body between said flutes and the fluted portions of said pin body functioning to distribute lateral bending forces on said pin body along the length thereof.

18. The combination of claim 17 wherein the diameter of the pin body at the flute most proximate the pin head is smaller than at the more distal flutes.

19. A bolt assembly for securing a mud flap upper margin having a horizontal aperture formed therethrough to a vehicle mounting portion having a horizontal bore therethrough with which said aperture is registered, a pin member comprising an elongated pin body having a proximal end and a distal end, a pin head on said proximal end, said proximal end of said pin body having a plurality of flutes transverse to the length of said pin body and spaced from each other, the diameter of the pin body at the flute most proximate the pin head being smaller than at the more distal flutes, said pin body being adapted to extend through said aperture and bore with said pin head opposing the side of said upper margin remote from said vehicle mounting portion, said pin body having external threads along a length portion at said distal end, an abutment assembly including a threaded bore formed therethrough threaded on said length portion for opposing side of said vehicle mounting portion remote from said flap upper margin.

* * * * *